3,510,316
NONFAT FROZEN DAIRY DESSERT
Clinton W. Decker, 11023 14th NE.,
Seattle, Wash. 98125
No Drawing. Continuation-in-part of application Ser. No. 367,881, May 15, 1964. This application Dec. 31, 1964, Ser. No. 422,537
Int. Cl. A23g 5/00
U.S. Cl. 99—136      8 Claims

ABSTRACT OF THE DISCLOSURE

A nonfat frozen dairy dessert having comparable body, texture and flavor as high butterfat containing frozen dairy dessert of the same total solids content, ice cream, ice milk or sherbet. The solids content normally provided by butterfat is replaced by a combination of increased nonfat milk solids and low dextrose equivalent (D.E.) corn syrup solids. The nonfat milk solids content may range as high as 19% by weight and the corn syrup solids may range as high as 13% by weight. The butterfat content can be held at 0.5% or less and, with the combination of increased nonfat milk solids and corn syrup solids, adverse effect on flavor is avoided. "Sandiness" resulting from crystallization of lactose is prevented by seeding with fine lactose crystals before packaging.

---

The present invention relates generally to a process and formulation for producing a nonfat frozen dairy dessert from nonfat dairy product sources.

The present application is a continuation-in-part of my co-pending U.S. application Ser. No. 367,881, filed May 15, 1964 now abandoned.

The development of the present invention arose from the need for desserts and the like, and especially a frozen dairy dessert, with little or no fat content, for heart patients who are on a fat restricted diet. In addition, quite a need exists for low calorie desserts and the like for a large segment of the population wishing to restrict their caloric intake or who are on prescribed diets for that purpose. Prior to this time, only dietary frozen dairy desserts were available in which sugar substitutes were used to make a product for use by diabetic patients or people with diabetic tendencies. The present invention not only answers the needs stated but also presents a highly palatable frozen dairy dessert which is virtually nonfat and which contains approximately 45% fewer calories, per equivalent serving, than ice cream or sherbet. The present invention thus not only directly benefits persons in the categories stated from a health standpoint, but allows those persons to continue to enjoy the pleasure of eating frozen dairy desserts to which they are accustomed.

The frozen dairy dessert of the present invention is a unique product and differs from ice cream or any other frozen dessert heretofore manufactured in that it is made to be as fat free as possible. It is low in caloric content and yet can be made with variable total solids content to equal that of ice cream or ice milk and at the same time respectively resemble as near as possible the body and texture of ice cream or ice milk in order to have a product acceptable to the public. The novel concepts of the present invention are accomplished by using only dairy product sources of the so-called nonfat type such as nonfat dry milk solids (skim powder), skim milk and concentrated skim milk or a variety of these products.

The primary object of the present invention, is therefore to provide a nonfat frozen dairy dessert having a low caloric content with approximately the same total solids content as ice cream or ice milk as desired.

Another object of the present invention is to provide a nonfat frozen dairy dessert which is highly palatable and acceptable to the public.

Another object of the present invention is to provide a nonfat frozen dairy dessert of the type described which is free from what is known in the art as "sandiness."

Yet another object of the present invention is to provide a nonfat frozen dairy dessert using only dairy product sources of the so-called nonfat type such as nonfat dry milk solids (skim powder), skim milk and concentrated skim milk or a variety thereof.

A further object of the present invention is to provide a nonfat frozen dairy dessert having a maximum butterfat content of approximately 0.5% and manufactured from nonfat dairy product ingredients.

A further object of the present invention is to provide a nonfat frozen dairy dessert having a total solids content of approximately the same as normal ice cream, in the range of 37 to 40%, or as ice milk, in the range of 32–35% total solids.

A further object of the present invention is to provide a nonfat frozen dairy dessert having special dietary advantages by virtue of a minimum butterfat content, a higher protein content and a lower caloric content than other frozen dairy desserts.

Other more particular objects and advantages of the invention will, with the foregoing, appear and be understood in the course of the following description and claim.

From a practical standpoint, the term "nonfat frozen dairy dessert," as applied to the present invention, requires some clarification. For practical purposes, it is impossible to remove all butterfat in ordinary commercial skimming or separating equipment. Usually a few hundredths of one percent butterfat remains in the skim milk after separating in the most efficient of separators. When this skim milk is further concentrated in vacuum pans, the butterfat content is increased in proportion to the degree of concentration. If the concentrate is dried still further, additional increase is made in the butterfat content. Allowance is made for this in the Federal standards for nonfat dry milk solids (dried skim milk) in that the maximum butterfat permissible in this product is 1.5%. Therefore, when defining a nonfat frozen dairy dessert, allowance must be made for residual butterfat and a maximum practical butterfat content set for practical conditions of manufacture. As will be shown later in the specification, in specific formulations, a nonfat frozen dairy dessert made solely from nonfat dry milk solids could contain a maximum of 0.25% butterfat content (a fat content only slightly higher than lettuce for instance).

Some allowance or tolerance must also be made for picking up butterfat from extraneous sources and from an occasional higher than normal fat content of skim milk or other products which will happen in commercial practice. For example, in commercial freezing and manufacturing processes it is possible to pick up additional butterfat in lines, vats, freezers etc., during the manufacturing process due to the common practice of following one butterfat product right behind another in the manufacturing process without washing lines in order to save expensive butterfat. To allow for this extraneous butterfat pickup, an additional leeway of 0.25% should be allowed. This would, under optimum commercial conditions, make a total butterfat content of 0.5% (about the same as watercress for instance). Therefor, for practical purposes, it is best to define a nonfat frozen dairy dessert as one containing 0.5% or less butterfat.

In order to implement the concept of a nonfat frozen dairy dessert having the same total solids content as ice cream, for body acceptable to the public, it is required that a minimum of 10% butter fat (Federal standards) be replaced with other solids. For ice milk approximately 4% butterfat must be replaced. To replace the butterfat, there is available sugar, corn syrup solids, and nonfat milk solids. The amount of sugar is restricted to 15% sucrose, or its equivalent in sweetness, for plain ice cream and up to 18% for fruit or chocolate ice cream. Levels higher than these are criticized as too sweet and may cause too wet an ice cream to be drawn from the freezer due to freezing point depression. Part of the sugar as sucrose may be replaced with corn syrup solids which have less sweetness than sucrose and depress the freezing point less. Again we are limited to a few percent of corn syrup solids because of flavor considerations. The last source of solids that could be increased is nonfat solids from dairy product sources. According to the present invention, nonfat dairy products and corn syrup solids are used to replace the butterfat solids of conventional ice cream or ice milk.

Considering first the use of nonfat milk solids (or solids—not-fat), said use has been restricted in the past to about 11% in ice cream due to the tendency of the milk sugar lactose to crystalize out under certain storage conditions. The grainy lactose crystals have the feeling of sand in the mouth due to the relatively insoluble nature of lactose and this defect is known to the trade as "sandiness." According to my discovery now covered by U.S. Pat. No. 2,641,546, this defect may be overcome and now makes it possible to incorporate a higher non fat solids content in frozen dairy desserts. According to the process covered by my prior patent, crystalline lactose in the form of fine lactose particles may be added to the formulated mix before freezing, while it is being frozen, or after it has been frozen and thus contemplates such addition at any state of processing or freezing, or after freezing, until the frozen product has been packaged. The present invention thus incorporates the concepts of my prior patent in order to use a nonfat milk solids content which is higher than formerly possible in frozen dairy desserts.

As aforementioned, the second type of solids which are used to increase the total solids content in the frozen dairy dessert of the present invention is corn syrup solids. These solids may be used in the form of corn syrup or dried corn syrup solids made from drying corn syrup. In recent years it has been the practice to increases the total solids of ice cream mixes 1½% to 2% by use of corn syrup solids. This is possible because the corn syrup solids are less sweet than sucrose. Dried corn syrup solids is rated about 50% as sweet as sucrose, 42 D.E. (dextrose equivalent). Corn syrup is rated about 40% as sweet, and a newer 28 D.E. corn syrup about 30% as sweet. Both 42 D.E. and 28 D.E. corn syrup are also dried and sold as corn syrup solids. For the purpose of the present invention, it has been found that 28 D.E. corn syrup or dried corn syrup solids made from this syrup are the most desirable for a nonfat frozen dairy dessert, although other kinds may be used if desired. However, by using the type mentioned, I am able to use 10 or 11% of the total weight in this form. Normally the maximum use of corn syrup solids in ice cream or ice milk is about half this level. Other advantages of the lower D.E. corn syrup is that it has the best flavor (least corn syrup flavor which has been a limiting factor of other corn syrups). Therefor, the 28 D.E. corn syrup, or corn syrup solids made from it, offers the best approach to building total solids in a non-fat frozen dessert without increasing the sweetness beyond the desired 15% sweetness level.

The stabilizers and emulsifiers which are contemplated for use in the present invention are the same as those permitted in the Federal standards of identity for frozen dairy desserts. The stabilizers include sodium alginate, propylene glycol alginate, locust bean gum, gelatin, guar gum, carboxymethylcellulose, and carrageenan. The emulsifiers that can be used include polysorbate 80 (Tween 80 or polyoxyethylene sorbitan mono-oleate), and Tween 65 (polyoxyethylene sorbitan mono-stearate), and mixtures of mono- and di-glyceride stearates, the so-called mono type of emulsifier.

Having described the concept leading to the development of the nonfat frozen dairy dessert and the various ingredients which can be used in such a product, the following formulations are offered for making such a product having a total solids content approximately that of ice cream (37 to 40% total solids), and of ice milk (33-37% total solids).

REPRESENTATIVE FORMULAS FOR NONFAT FROZEN DAIRY DESSERT

[Percent by weight (solids)]

| | | Representative formulas | |
|---|---|---|---|
| Ingredient | Range | 37-40% T.S. | 33-37 %T.S. |
| Nonfat milk solids | 10.0-19.0 | 17.0 | 10.0 |
| Sugar | 9.0-13.0 | 11.0 | 10.0 |
| Corn syrup solids | 9.0-13.0 | 10.0 | 13.0 |
| Stabilizer | 0.2-0.5 | 0.3 | 0.4 |
| Emulsifier | 0.04-0.15 | 0.04 | 0.04 |
| Total solids | | 38.59 | 33.44 |

Realizing that a variety of formulas can be deivsed using the ingredients discussed and following the concepts of the present invention, the above table is given to show the range of ingredient amounts that can be used and represents two typical formulas for the purpose of determining an analysis and calorie content. The higher total solids formula (38.59% T.S.) is chosen because the total solids (T.S.) content is in the range of ice cream and gives the best body and texture.

It will also be noted that the above stated ranges for stabilizer and emulsifier ingredients have been set within the legal limits provided by the Federal Food and Drug Administration. It is to be understood that the invention is therefor not limited to these ranges but may be varied as permitted by law.

The following tables represent the analysis and calorie content taken from the representative higher total solids formula set out above and a comparison of nonfat frozen dairy dessert with other frozen desserts:

APPROXIMATE ANALYSIS—NONFAT FROZEN DAIRY DESSERT

Percent by wt., solids
Protein ------------------------------------ 6.20
Carbohydrate ------------------------------- 30.00
Minerals ----------------------------------- 1.30
Stabilizer --------------------------------- 0.30
Fat ---------------------------------------- 0.25
Emulsifier --------------------------------- 0.04

Per qt.—calories—100% overrun (19 ozs.—538 grams)

Calories
Protein, 33.5 gms.×4 ----------------------- 134.0
Carbohydrate, 162.0 gms.×4 ----------------- 648.0
Fat, 1.4 gms.×9 ---------------------------- 12.6

794.6

¼ pt. serving 794.6/8=99.3 calories

FORMULA AND ANALYSIS COMPARISONS OF NONFAT FROZEN DAIRY DESSERT WITH OTHER FROZEN DESSERTS

| Formula Comparisons | Average range of values, percent weight, solids | | | |
|---|---|---|---|---|
| | Nonfat | Ice cream | Ice milk | Sherbet |
| Nonfat milk solids | 17.00 | 10–12 | 12–14 | 2–5 |
| Fat | 0.25 | 10–12 | 2–7 | 1–2 |
| Sugar | 11.00 | 12–14 | 12–14 | 18–20 |
| Corn syrup solids | 10.00 | 3.4 | 4–5 | 8–10 |
| Stabilizer | 0.30 | 0.5 (max) | 0.5 (max) | 0.5 |
| Emulsifier (Polysorbate 80) | 0.04 | 0.1 (max) | 0.1 (max) | |
| APPROXIMATE ANALYSIS, AVERAGE COMPOSITION, 100% OVERRUN | | | | |
| Protein | 6.2 | 4.0 | 4.7 | 1.2 |
| Carbohydrate | 30.0 | 22.0 | 25.0 | 28.0 |
| Minerals | 1.3 | 0.85 | 0.96 | 0.2 |
| Fat | 0.25 | 11.0 | 4.0 | 1.5 |
| Calories per qt. (approx) | 800 | 1160 | 935 | 1190 |
| Calories per ¼ pt. serving (approx.) | 100 | 145 | 117 | 149 |

Comparing the formulas for the different frozen desserts, nonfat frozen dairy desserts formulated according to the present invention are quite different in composition from any of the frozen dairy desserts contained in the Federal standards for ice cream, ice milk and sherbets. Because the nonfat frozen dairy dessert is made only from nonfat dairy product sources, it is higher in protein and, having a minimum of butterfat, it is reduced in calories. Because of the compositional differences of the nonfat frozen dairy dessert of the present invention as compared to ice cream, ice milk, and sherbet, it has different texture and flavor qualities that are uniquely its own. It also differs markedly from sherbets in composition and overrun, and by the fact that it contains no added acid. These qualities are also achieved without the presence of insoluble lactose crystals which normally create an undesirable "sandiness" in texture, by the application of the process covered by my prior patent. In addition, it is pointed out that nonfat frozen dairy desserts according to the present invention can be made in a variety of flavors if desired.

It will be readily apparent to those skilled in the art that the present invention provides novel and useful improvements in the processing and formulation of nonfat frozen dairy desserts and the formulations described may be subject to numerous modifications and variations well within the purview of this invention. The applicant herein intends only to be limited to a liberal interpretation of the specifications and appended claims.

Having thus described the invention, what is claimed as new and desired to be secured by Letters Patent is:

1. A nonfat frozen dairy dessert having body, texture and flavor comparable to high butterfat containing frozen dairy dessert of the same total solids content, and having the following composition and approximate ranges of proportions:

| | Percent by wt., solids |
|---|---|
| Nonfat milk solids | 10.0–19.0 |
| Sugar | 9.0–13.0 |
| Low dextrose equivalent (D.E.) corn syrup solids | 9.0–13.0 |
| Stabilizer | 0.2–0.5 |
| Emulsifier | 0.04–0.15 |

2. A nonfat frozen dessert having body, texture and flavor comparable to high butterfat containing frozen dairy dessert of the same total solids content, and having the following composition and approximate proportions:

| | Percent by wt., solids |
|---|---|
| Nonfat milk solids | 17.0 |
| Sugar | 11.0 |
| Low dextrose equivalent (D.E.) corn syrup solids | 10.0 |
| Stabilizer | 0.3 |
| Emulsifier | 0.4 |

3. A nonfat frozen dairy dessert having body, texture and flavor comparable to high butterfat containing frozen dairy dessert of the said total solids content, and having the following composition and approximate proportions:

| | Percent by wt., solids |
|---|---|
| Nonfat milk solids | 10.0 |
| Sugar | 10.0 |
| Low dextrose equivalent (D.E.) corn syrup solids | 13.0 |
| Stabilizer | 0.4 |
| Emulsifier | 0.04 |

4. A nonfat frozen dairy dessert having body, texture and flavor comparable to high butterfat containing frozen dairy dessert of the same total solids content, and which includes nonfat milk solids of from 10.0 to 19.0 percent by weight, low dextrose equivalent (D.E.) corn syrup solids of from 9.0 to 13.0 percent by weight, and a maximum butterfat of 0.5 percent by weight, said dairy dessert having a total solids content of from 33–40 percent by weight.

5. A nonfat frozen dairy dessert having body, texture and flavor comparable to high butterfat containing frozen dairy dessert of the same total solids content, and which includes nonfat milk solids of from 10.0 to 19.0 percent by weight and low dextrose equivalent (D.E.) corn syrup solids of from 9.0 to 13.0 percent by weight, with crystalline lactose in the form of fine lactose particles being added to the mix or semi-frozen dessert prior to or during packaging.

6. A nonfat frozen dairy dessert having body, texture and flavor comparable to high butterfat containing frozen dairy dessert of the same total solids content, and which includes nonfat milk solids of from 10.0 to 19.0 percent by weight, low dextrose equivalent (D.E.) corn syrup solids of from 9.0 to 13.0 percent by weight, a maximum butterfat content of 0.5 percent by weight, and a total solids content of from 33–40 percent by weight, with crystalline lactose in the form of fine lactose particles being added to the mix or semi-frozen dessert prior to or during packaging.

7. A frozen dairy dessert product having body, texture and flavor comparable to high butterfat containing frozen dairy dessert of the same total solids content, wherein the usual butterfat content is replaced by a combination of nonfat milk solids and low dextrose equivalent (D.E.) corn syrup solids, said nonfat milk solids content ranging from 10.0 to 19.0% by weight of the mix, and corn syrup solids content ranging from 9.0 to 13.0% by weight of the mix, said dairy dessert product having a total solids content ranging from 33 to 40% by weight.

8. The frozen dairy dessert product according to claim 7 wherein; crystalline lactose in the form of fine lactose particles is added to the mix or semi-frozen dessert prior to or during packaging.

References Cited

UNITED STATES PATENTS

| 2,500,315 | 3/1950 | Koerver | 99—136 |
| 2,558,453 | 6/1951 | Minster | 99—136 |
| 2,641,546 | 6/1953 | Decker | 99—136 |

RAYMOND N. JONES, Primary Examiner

J. M. HUNTER, Assistant Examiner